US006652699B1

(12) United States Patent
Sadr

(10) Patent No.: US 6,652,699 B1
(45) Date of Patent: Nov. 25, 2003

(54) FLANGED MEMBER WITH BARRIER LAYER

(75) Inventor: Changize Sadr, North York (CA)

(73) Assignee: Salflex Polymers Ltd., Weston (CA)

( * ) Notice: Subject to any disclaimer, the term of this patent is extended or adjusted under 35 U.S.C. 154(b) by 97 days.

(21) Appl. No.: 09/649,611

(22) Filed: Aug. 29, 2000

Related U.S. Application Data

(63) Continuation-in-part of application No. 09/505,719, filed on Feb. 17, 2000.

(51) Int. Cl.$^7$ ................................................ B29C 47/00
(52) U.S. Cl. .............................. 156/244.11; 156/304.2; 156/304.3; 156/304.6; 156/242
(58) Field of Search ............................... 265/21.1, 21.3, 265/141.1; 264/511, 514, 568, 515, 150, 151; 156/242, 244.24, 244.11, 256, 258, 304.2, 304.3, 304.6, 158

(56) References Cited

U.S. PATENT DOCUMENTS

| | | | |
|---|---|---|---|
| 2,802,513 A | | 8/1957 | Stoeckel |
| 4,109,813 A | * | 8/1978 | Valyi ........................ 206/524.2 |
| 4,507,071 A | * | 3/1985 | Hahn et al. ............. 264/171.27 |
| 4,713,296 A | * | 12/1987 | Aoyama et al. .......... 264/176.1 |
| 5,443,098 A | | 8/1995 | Kertesz |
| 5,460,771 A | * | 10/1995 | Mitchell et al. ............. 264/151 |
| 5,820,956 A | * | 10/1998 | Hatakeyama et al. ...... 428/35.4 |
| 6,109,006 A | * | 8/2000 | Hutchinson ................ 215/13.1 |

FOREIGN PATENT DOCUMENTS

| | | |
|---|---|---|
| DE | 94 21 501 U1 | 2/1996 |
| DE | 196 35 334 A1 | 3/1998 |
| EP | 0 953 364 A2 | 4/1992 |
| WO | PCT/US98/26729 | 12/1998 |

\* cited by examiner

*Primary Examiner*—Jack Lavinder
*Assistant Examiner*—Bradley King
(74) *Attorney, Agent, or Firm*—Bereskin & Parr

(57) ABSTRACT

In order to attach a fuel system component such as a pipe nipple to a fuel tank having a polyethylene outer layer, the fuel system component is made from a first material which may have desirable characteristics such as resistance to creep, but which may not be easily weldable to the polyethylene outer layer of the tank. The flange member is used for attachment to the body portion of the fuel system component by welding and for attachment to the polyethylene layer of the tank. To inhibit hydrocarbon vapour flow-through through the flange member, the flange member includes a barrier layer which extends from one side of the flange to the other and which surrounds the central aperture. In another embodiment of the invention, the flange member is made from a material which has the necessary barrier properties.

3 Claims, 4 Drawing Sheets

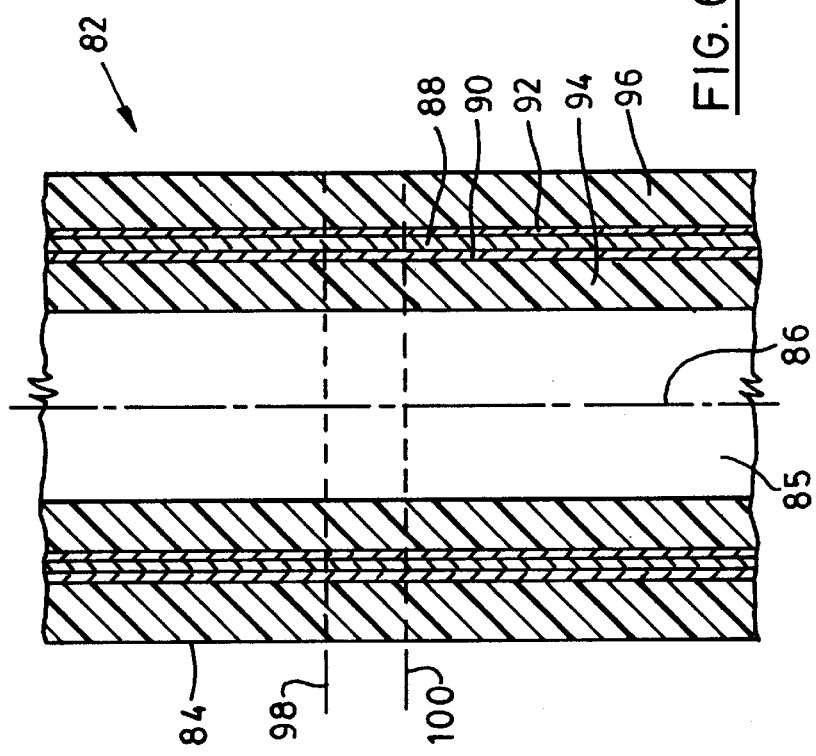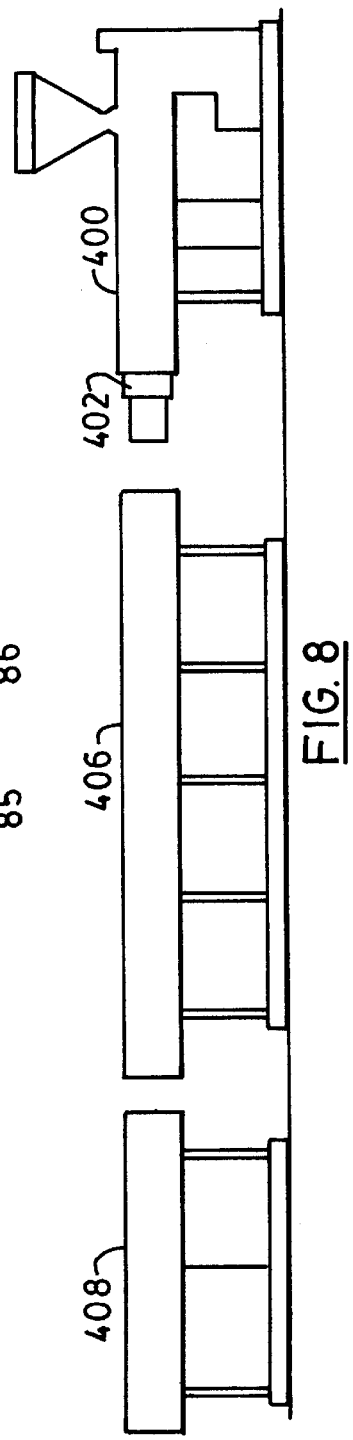

FLANGED MEMBER WITH BARRIER LAYER

This application is a continuation-in-part of application Ser. No. 09/505,719 filed Feb. 17, 2000.

FIELD OF THE INVENTION

This invention relates to fuel system components and in particular, to plastic structures such as fuel tanks and the like which may be made using blow molding structures. In particular, the invention relates to a method and structure for creating a flange member which may be used to inhibit hydrocarbon vapour permeation through the flange member.

BACKGROUND OF THE INVENTION

Hydrocarbon containing fuels such as gasoline are the most common power source for internal combustion engines. Gasoline must be carried by the vehicle, usually in a fuel tank. Heretofore fuel tanks have been manufactured from metal. More recently however, much work has been done on fuel tanks made from plastic resins, typically, polyethylene. Polyethylene is a very suitable material for making fuel system components such as tanks in that it is readily moldable using blow molding techniques. However, it has been determined that fuel vapour can permeate through the wall of the fuel system component such as a fuel tank when the wall is manufactured solely from polyethylene. In order to provide suitable anti-permeation characteristics, more complex wall structures for such fuel system components have been developed. In our co-pending patent application Ser. No. 09/192,295, filed Nov. 17, 1998, the disclosure of which is herein incorporated by reference, there is a discussion of a multi-layer fuel conduit. Such conduits are readily manufacturable using blow molding techniques.

Plastic molded fuel tanks have now been proven to be commercially acceptable on incorporation of some means to control permeation. Typically, the permeation can be controlled by barrier layers such as a layer of ethylene vinyl alcohol copolymer (EVOH) which is incorporated into a multi-layer parison and wall structure. Typically, in order to adhere the EVOH layer, adhesive is supplied to either side of the EVOH barrier layer as the barrier layer is extruded from the extrusion head. Typically, the adhesive attaches the EVOH layer to an outer layer of polyethylene and an inner layer of polyethylene. Either or both of the polyethylene materials may include either virgin material or scrap, reground, polyethylene material or combinations of the two. Where required by the conditions, the inner layer of the fuel system component may also be modified so as to conduct electricity. This helps provide an electrical path to bleed off static electricity which might be generated in or around the fuel stored in the fuel system component. All of the various layers are simultaneously extruded through a multi-channel extrusion head to produce a parison ready for molding.

In the blow molding technique, a parison is extruded from an extrusion head. The parison is normally allowed to hang vertically from the extrusion head as the correct amount of, parison to make the desired part is extruded. The parison is placed between the open portions of a blow molding mold. The blow molding mold is then closed around the parison and the parison is pinched off. A convenient structure, typically a blow molding needle, pierces the wall of the parison and blowing gas under pressure is introduced into the interior of the parison. The parison which at that stage is hot and still quite flowable, is expanded outwardly and the shape of the cavity in the blow mold determines the exterior configuration of the blow molded part.

Using the blow molding techniques and barrier incorporation technology discussed above, fuel system components may be manufactured which contain barrier layers which significantly inhibit the permeation of hydrocarbon vapours. In many instances however, other fuel system components may be attached to items such as fuel tanks. Many fuel tanks have pipe nipples, flanges or other like elements which are attached to the tank so as to couple the tank to conduits, vapour return lines and the like. These other fuel system components are then attached to the fuel tank, typically surrounding an aperture so as to permit fluid communication with the interior of the tank.

Although polyethylene is easily moldable, polyethylene deflects under load and is known to creep. Thus, if a hose or like component is attached to an underlying polyethylene component by a hose clamp or the like, the polyethylene material will creep over time under the stress induced by the pipe clamp. This then leads to potential looseness in the fitting between the pipe nipple and the conduit overlying the pipe nipple. This problem has been recognized in U.S. Pat. No. 5,443,098, Rasmussen. In the Rasmussen patent, it is suggested that a portion to which a conduit is to be affixed be manufactured from a material such as polyamide which has a much higher creep resistance. While this answers the problem of creep, it introduces another problem. Polyamide is not easily weldable directly to polyethylene. Thus, in order to match the polyamide based component to the fuel tank, the Rasmussen patent suggests the pipe nipple should be manufactured from a two part structure. The second part of the structure as outlined in the Rasmussen patent is made from a non-reinforced modified polyethylene. The modified polyethylene product forms a diffusion bond with the polyamide and may also be welded to the polyethylene outer layer of a fuel tank. Other components may also be attached to a fuel tank using such a layer of polyethylene or modified polyethylene chosen to simplify welding to the tank structure. Typically the form of the component for welding is in the nature of a flange member. If creep is not an issue in the particular component, then the entire member may be made from a modified polyethylene or the flange may be attached to a member made of some other substance.

The flange made of polyethylene or modified polyethylene provides another path for fuel vapour permeation. Thus, while polyamide products inherently exhibit fuel vapour permeation characteristics which are satisfactory, flange members which may be used in association with polyamide containing products provide a possible escape route for fuel vapours permeating through the flange.

It would be desirable to create a flange member which would help in inhibiting fuel vapour permeation from a fuel tank system. Such a flange member could then be used in association with fuel tanks and other components or portions of components which may otherwise have sufficient and acceptable fuel vapour inhibition characteristics.

SUMMARY OF THE INVENTION

In accordance with one aspect of the invention, a flange member comprises a closed wall. The wall has an internal surface, the internal surface of the wall defining an internal aperture. The wall also has an external surface. In addition, the wall has first and second ends. The distance between the first and second ends is less than the minimum width of the flange member. The wall of the flange member has at least a first polymeric layer, a second polymeric layer and a barrier layer located between the first and second polymeric layers. The barrier layer surrounds the internal aperture and extends from the first end to the second end.

In another aspect of the invention, the invention involves a process for making a flange member having a barrier layer for inhibiting hydrocarbon vapour flow-through. The process involves forming a multilayer parison. The parison has at least a first polymeric layer, a second polymeric layer and a barrier layer between the first and second polymeric layers. The parison is expanded to form a tube with the tube having a wall and the wall defining an internal aperture extending axially along the tube. The process further involves cutting the tube, transversely to the axis to form a flange member.

In another aspect of the invention, the invention involves a flange member that is made from a material which contains an inherent barrier property so as to inhibit the flow of hydrocarbon vapours therethrough.

In another aspect of the invention, the invention involves a process for making a flange member having an inherent barrier layer property for inhibiting hydrocarbon flow-through. The process involves forming a parison from a material which has an inherent barrier characteristic. The parison is expanded to form a tube with the tube having a wall and the wall defining an internal aperture extending axially along the tube. The process further involves cutting the tube, transversely to the axis to form a flange member.

DESCRIPTION OF THE DRAWINGS

Further and other aspects of the invention may now be appreciated from reviewing the following description of preferred embodiments of the invention, and in which:

FIG. 6 illustrates a cross-section through the product made from the parison and mold illustrated in FIG. 5;

FIG. 8 illustrates an alternative molding system for making the flange member of FIG. 2; and, FIG. 9 illustrates a cross-section similar to FIG. 1 showing an alternate form of flange member.

DETAILED DESCRIPTION OF PREFERRED EMBODIMENT

Figure 1:
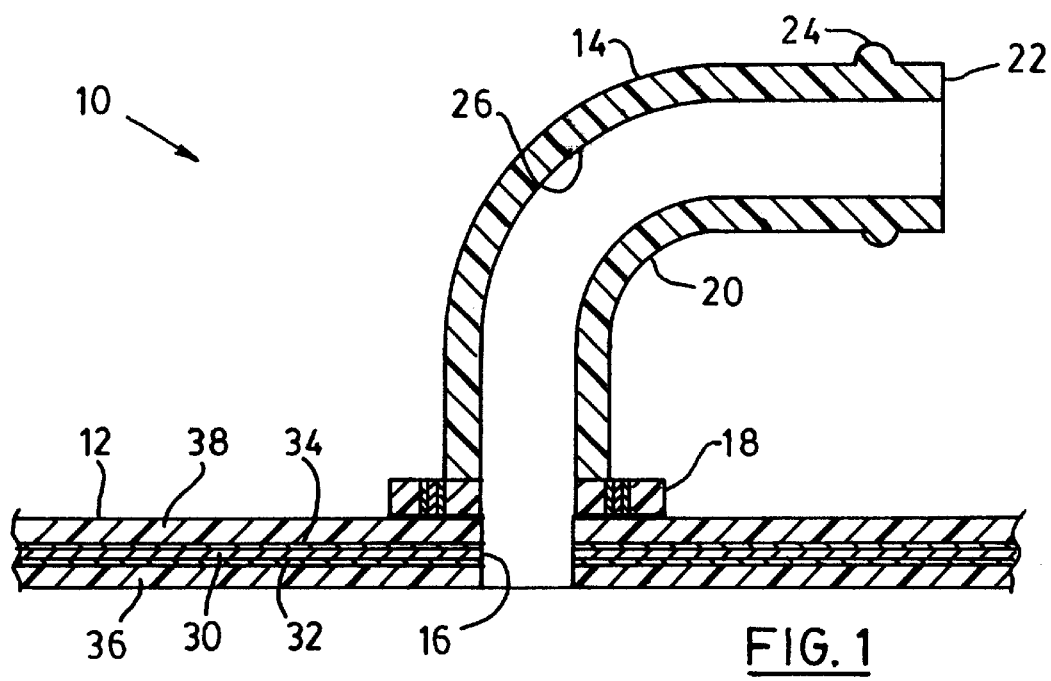
FIG. 1 illustrates in cross-section a fuel system comprising a fuel tank and a fuel system component attached to the fuel tank.

In FIG. 1, the fuel system 10 comprises a fuel tank 12, a portion of which is illustrated in FIG. 1, and a fuel system component 14. The fuel system component 14 is a pipe nipple which may be used to attach a conduit for fluid communication with the interior of the tank 12. The tank 12 comprises an aperture 16 through the tank wall. The fuel system component 14 comprises a flange member 18 and a body portion 20. The body portion 20 terminates in a spigot end 22 and includes a mounting rib 24.

The fuel system component 14 comprises an internal passageway 26 for providing communication between the interior of the fuel tank 12 and the spigot end 22 of the fuel system component. The pasgageway 26 consists of the internal passageway of the body portion 20 and the internal aperture of the flange member 18 which are in registry.

The body portion 20 of the fuel system component 14 may advantageously be manufactured from a material which has acceptable creep characteristics. Such materials may include nylons or other polyamides and similar products. When a conduit is attached to the spigot end 22, the conduit may be pushed over the mounting rib 24. Then an encircling clamp may be used to clamp the conduit to the spigot end of the fuel system component 14. Typically, the material from which the fuel system component body portion will be manufactured, is not easily weldable to the outer layers of the fuel tank 12. However, the material from which the body portion 20 of the fuel system component 14 is manufactured may also have sufficient barrier properties such that hydrocarbon vapours present in the passageway 26 will not pass through the wall of the housing 20 or will do so only in acceptably small quantities.

In order to inhibit fuel vapour permeation through the wall of the fuel tank 12, the wall comprises a barrier layer 30. The barrier layer 30 may be made from EVOH or other similar barrier compounds. Typically, the barrier layer 30 will include an inner adhesive layer 32 and an outer adhesive layer 34. The adhesive layers 32 and 34 are used to attach the adhesive to an inner polyethylene layer 36 and to an outer polyethylene layer 38 respectively. Thus, the wall of the tank 12 may contain five layers of materials. If desired, the tank may contain additional layers. Typically, the inner layer 36 and the outer layer 38 may be made from polyethylene. The polyethylene may be either virgin material or scrap reground material, or any mixtures of these materials. In addition, the inner layer 36 for some fuel system components may contain an innermost layer which is electrically conductive where that is desirable to prevent the build up of static electricity.

The flange member 18 may be made from polyethylene or modified polyethylene. The flange member 18 may be attached to the body portion 20 of the fuel system component 14 prior to attaching the fuel system component 14 to the tank. Alternatively, the fuel system component 14 may be assembled by first attaching the flange member 18 to the wall of the tank 12 and thereafter welding the body portion 20 to the flange member 18.

Once the fuel system component 14 has been attached to the wall of the tank 12, the passageway 26 will be in registry with the aperture 16 to permit the inflow or outflow of liquid fuel and vapours.

Vapours are inhibited from passing through the tank wall by the barrier layer 30. Vapours are inhibited from passing through the body portion 20 of the fuel system component 40 by the nature of the material from which the body portion 20 is manufactured. However, the flange member 18 represents a possible path for passage of hydrocarbon vapours. In prior art devices, such fuel system vapours may pass directly through the polyethylene or modified polyethylene of a flange member.

To inhibit such flow of hydrocarbon vapours, the flange member 18 includes a barrier layer.

Typically, the flange member 18 will be in the shape of a washer. From reference to FIG. 2 and FIG. 7, it will be observed that the flange member 10 has a closed Wall 50. The closed wall 50 has an internal surface 52. The internal surface 52 defines an internal aperture 54. The wall 50 has an external surface 56. In addition, the wall 50 has a first end 60 and a second end 62. (see FIG. 7)

Figure 7:
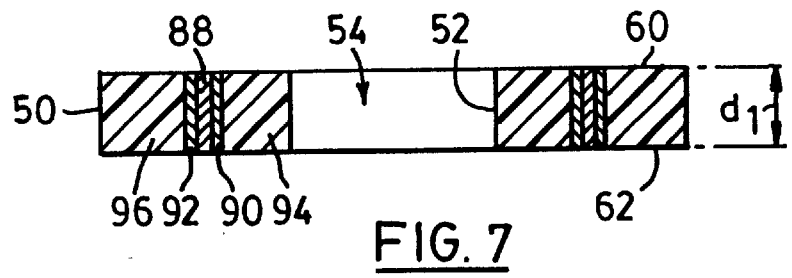
FIG. 7 illustrates a cross-section through the flange member of FIG. 2.
Figure 2:
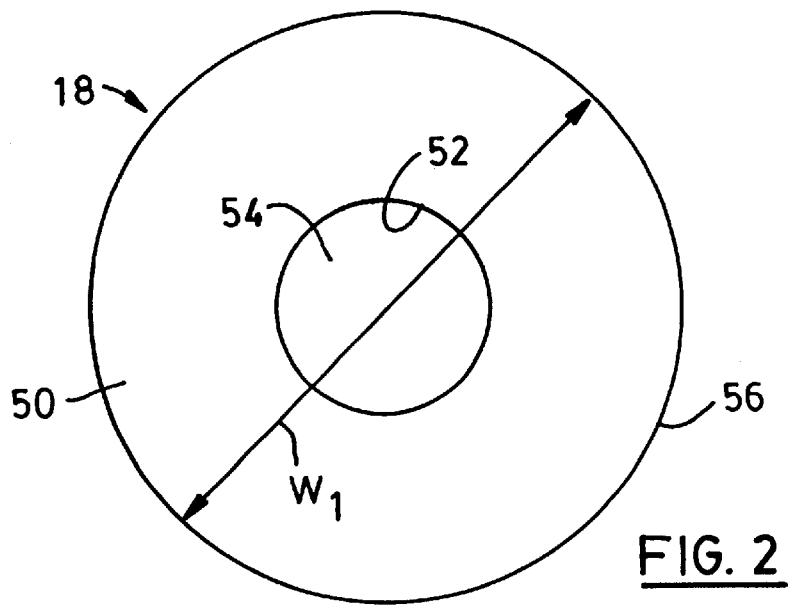
FIG. 2 illustrates a flange member which is a portion of the fuel system component illustrated in FIG. 1.

From reference to FIGS. 2 and 7, it will be observed, that the distance $d_1$ between the first and second ends of the wall 50 is considerably less than the diameter of the washer 18 illustrated in FIG. 2 as $w_1$. As the flange member 18 is in the form of a washer, and the external surface 56 is substantially cylindrical, the dimension $w_1$ is a diameter and is constant at any point around the surface 56.

Figure 3:
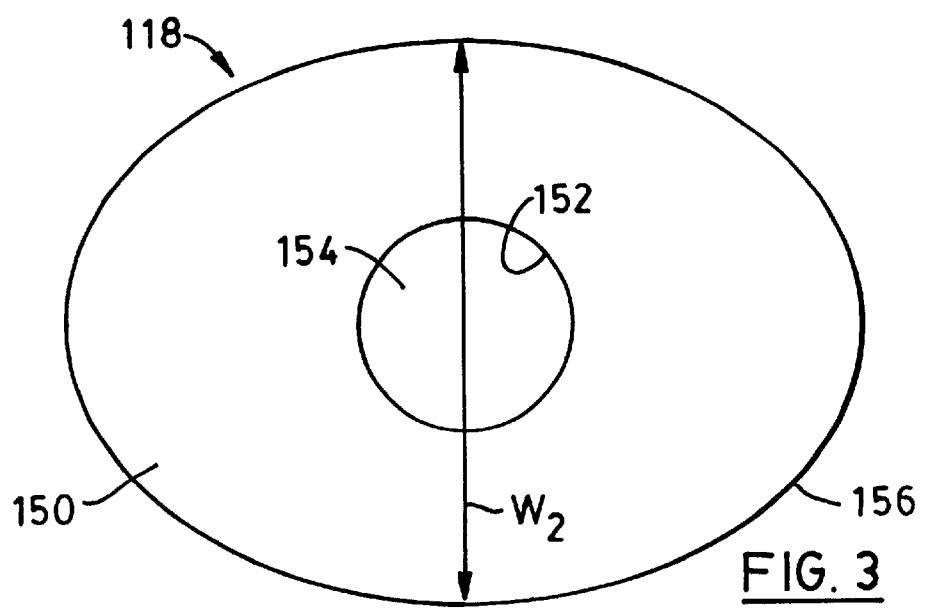
FIG. 3 is a new similar to FIG. 2 but showing an alternate form of a flange member made in accordance with the invention.

It is not necessary in accordance with this invention to have a washer which is in the form of two cylindrical walls 52 and 56. As shown in FIG. 3, a washer 118, comprises a closed wall 150 having an internal surface 152 and an external surface 156. The surface 152 defines an aperture 154 which is essentially circular. The surface 156 defines an elliptical structure rather than a cylindrical structure as shown for flange member 18 in FIG. 2. In the ellipse formed by the external surface 156 of the wall 150, the minimum width is illustrated as $w_2$.

Figure 4:
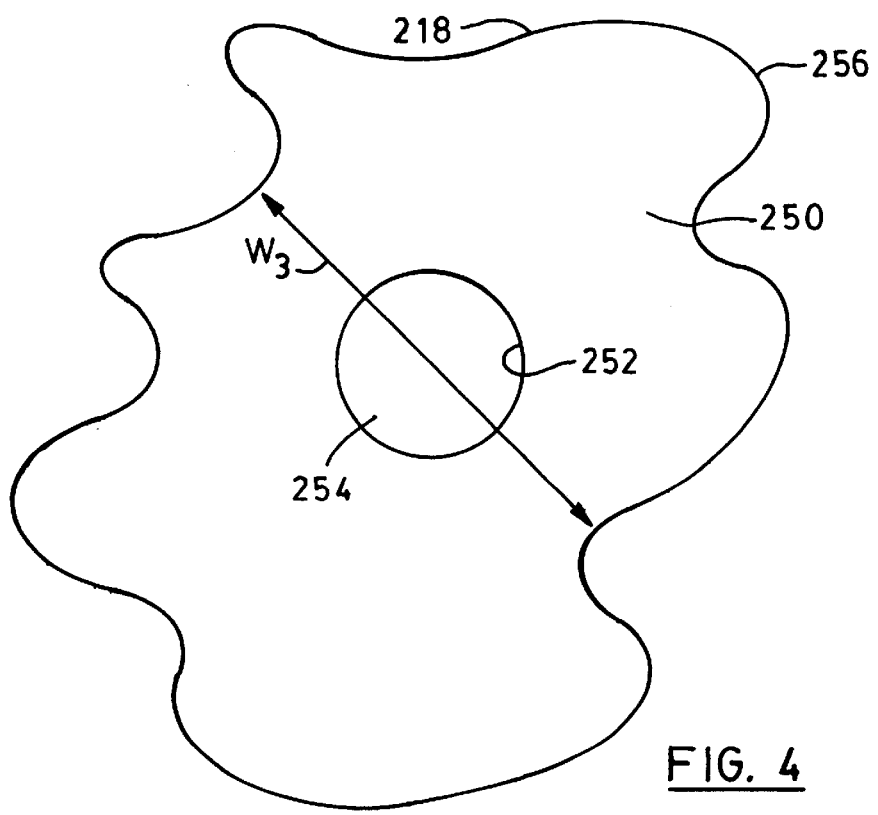
FIG. 4 is a view similar to FIG. 2 showing yet another form of a flange member in accordance with the invention.

FIG. 4 illustrates an alternate form of flange member 218. The flange member 218 has a wall 250 which has an internal surface 252 and an external surface 256. The shape of the external surface 256 is shown diagrammatically as a free-form geometric shape. The internal surface 252 defines an aperture 254. The configuration of the surface 256 is not limited, in accordance with this invention and may be any surface which can conveniently be formed in a molding process. Thus, the surface 256 may have any configuration as desired. Having such an irregular shape, there will be a minimum width line illustrated as $W_3$ which is the shortest straight line passing through the centre of the aperture 254 whose ends terminate at the surface 256.

The dimension $d_1$ may be the same for all of the flange members illustrated in FIG. 2, FIG. 3 and FIG. 4. In all cases, the distance $d_1$ between the first and second ends of the flange member is less than the minimum width of the flange member.

Figure 5:
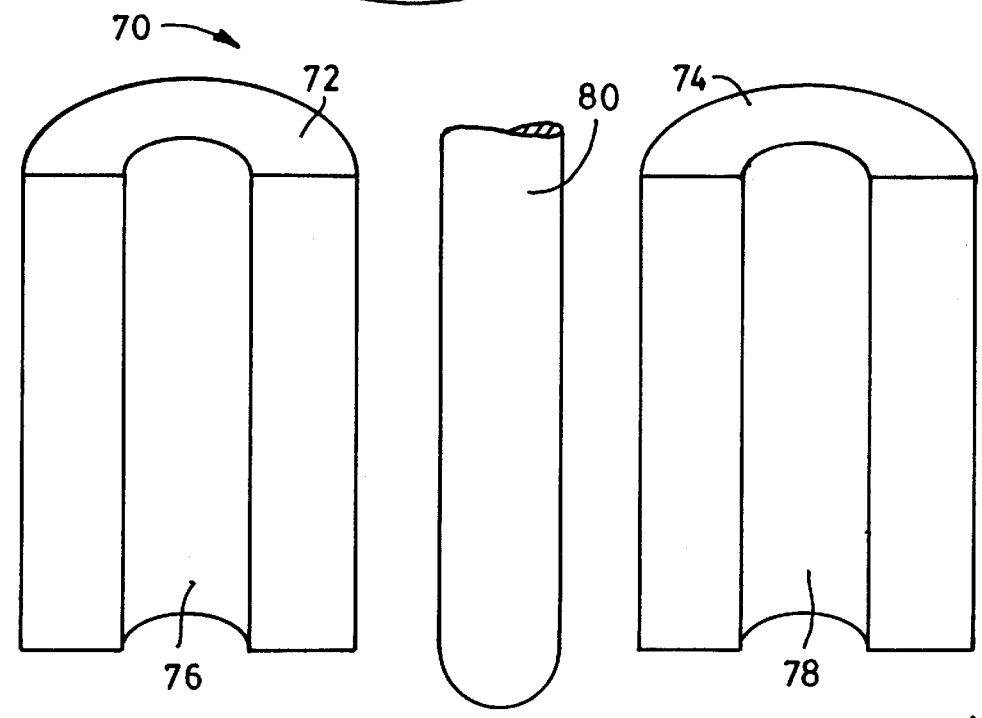
FIG. 5 illustrates a mold and parison for making the flange member of FIG. 2.

The flange members 18, 118 and 218 illustrated in FIG. 2 may be manufactured in a blow molding process. The essential elements of a blow molding process are illustrated in FIG. 5. In the blow molding process, there is a blow mold 70 comprising complimentary mold halves 72 and 74. The mold halves 72 and 74 have a cavity 76 and 78 respectively. When the mold halves 72 and 74 close, the cavity 76 and the cavity 78 are brought into registry with one another to close over a parison 80. In FIG. 5, the mold halves 72 and 74 have each been rotated 90° from their usual position in order to illustrate the cavity 76 and 78.

The parison 80 may be extruded from a multi-layer extrusion head. The parison then hangs vertically from the extrusion head, the mold 70 is closed about the parison and the parison is expanded by a blowing gas which is introduced into the interior of the parison through a needle or other similar aperture. When the mold is opened, a tubular molded structure having an external and internal configuration as desired is produced. The product produced is shown in FIG. 6. The molded product 82 has a multi-layer wall 84 and an internal aperture 85. Aperture 85 also has a general axis 86 extending longitudinally of the product 82. The wall 84 of the product 82 comprises a barrier layer 88, an internal adhesive layer 90, an external adhesive layer 92, an internal polymeric layer 94 and an external polymeric layer 96. The polymeric layers 94 and 96 may be of the same material or may be different material. Typically the polymeric material of layers 94 and 96 will be material which is weldable to the external layer 38 of a desired fuel tank. Additionally, the material of the layers 94 and 96 will be weldable to the material of the body portion 20 of the fuel system component 14.

In order to create the flange member 18 from the product 82, the product is cut in a direction which is substantially transverse to the axis 86. The cut is shown in FIG. 6 by means of the dotted lines 98 and 100. As shown in FIG. 6, the molded product 82 may have a length which is considerably longer than the dimension $d_1$ illustrated in FIG. 7. Thus, the molded product 82 may be made into a plurality of flange members 18 by cutting a series of flange members 18 from the molded product 82.

When the flange member 18 is cut from the molded product 82, then the multi-layer structure will correspond to the multi-layer structure illustrated in FIG. 7. Thus, flange member 18 illustrated in FIG. 7 has a barrier layer 88 which extends from one end 60 of the flange member 18 all the way to the other end 62 of the flange member 18.

When the flange member 18 is welded to the tank 12 as shown in FIG. 1, there is a barrier structure in the form of the barrier layer 88 which extends vertically in FIG. 1 between the outer layer 38 of the tank wall and the material of the body portion 20 of the fuel system component 14. This inhibits hydrocarbon vapour passage through the flange member 18.

Blow molding as explained above, produces a parison which has a dimensionally accurate exterior surface. However, the tolerance for the internal wall configuration of a blow molded product is not as precise as the exterior surface. Accordingly, while the blow molding technique described above is capable of producing a sufficiently accurate flange for some purposes, the location, configuration and dimension of the aperture 54, which is determined by the surface of the first end 52 may require precise location for some circumstances. This may be particularly true where an aperture in a fuel tank must be matched closely by the aperture 54 in the flange, or, in other cases where the aperture 54 in the flange must match closely with the internal gallery or conduit of the body portion 20 of the fuel system component 14. In such cases, the inherent limitations of the accuracy of the blow molding process may be insufficient.

FIG. 8 illustrates a machine used for manufacturing similar products and is what is usually referred to as a profile extrusion system. Such machines are available from manufactures such as HPM Corporation.

In a typical profiling extrusion operation, the machine consists of an extruder 400. The extruder 400 includes an extrusion head 402. The extruder 400 and the extrusion head 402 can produce a multi-layer parison substantially as described above. However, the parison produced in the extruder 400 is extruded horizontally rather than vertically. The extrusion head delivers the hot extruded parison into a vacuum tank 406. The vacuum tank 406 includes a chamber, which closely surrounds the exterior of the extruded parison. A vacuum is applied to the parison as the parison is drawn along the vacuum tank. The negative pressure applied to the external surface of the parison thus expands the parison so that the parison then assumes the external configuration dictated by the mold within the vacuum tank. By carefully controlling the external vacuum pressure on the external surface of the parison, much more accurate control is achieved of the wall thickness of the expanded parison. This in turn means that the finished location and dimension of the internal aperture 54 can be more precisely determined in this type of apparatus. After expansion the parison is cooled in a cooling chamber 408.

Where the final configuration of the extruded parison is substantially in the form of a cylinder, a continuous extrusion and expansion project may be utilized. The result of such a process, is a finished expanded, hardened parison similar to the product 82 illustrated in FIG. 6, but of indefinite length. The product 82*a* emerging from the apparatus shown in FIG. 8 may then be cut in a direction which is substantially transverse to its axis as discussed above in connection with the apparatus referred to in FIG. 5.

It will be observed, that the flange member 18 has a dimension $d_1$ which in use will effectively be the thickness of the flange which is considerably smaller than the diameter or minimum width w of the flange member. Notwithstanding that the member is relatively small in thickness d as compared to width w, there is a barrier layer which has been incorporated which effectively blocks flow of hydrocarbon vapours radially outwardly from the internal aperture 54 toward the external surface 56 of the flange member 18.

The shape of the external wall 56 is not limited by this invention and may be any shape that may conveniently be formed in a molding process. Similarly, the location and configuration of the internal aperture 54 is any shape which may be formed in a molding process. Where there is a complex external shape as shown with the flange member 218 in FIG. 4, the configuration of the internal aperture 254 may vary in several different aspects depending on the wall thickness of the parison and the structure within the mold which may provide for differing wall thicknesses at differing portions of the molded product.

The material from which the flange member may be made is also widely variable according to the necessary design constraints. Any materials which may be co-extruded through a multiple extrusion head along with a barrier layer may be used. The adhesive layers are not necessarily required depending upon the choice of material for the barrier layer and the choice of material for the polymeric layers. If a suitable bond can be made thermally, upon co-extrusion, then the adhesives may be eliminated.

The dimension $d_1$ is also open to variation. Any height of material may be cut from the molded member 82 to produce a flange having the installed thickness as desired to meet any design constraints.

The processes disclosed herein produce a flange element which is relatively thin as compared to its width and yet includes a barrier layer to inhibit hydrocarbon vapours from passing along the width from an internal aperture to the external surface of the flange element.

Figure 9:
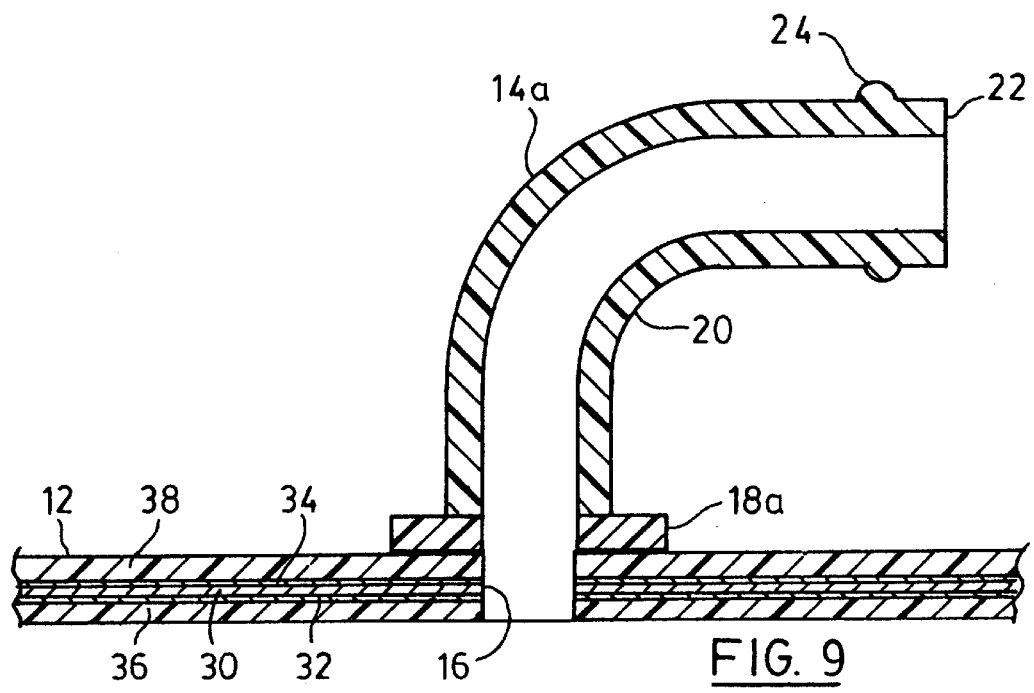

FIG. 9 illustrates an alternate embodiment of a flange member in accordance with the invention. Similar numerals have been used in FIG. 9 for the parts which are in common with FIG. 1. Thus, the fuel system component 14*a* is a pipe nipple which may be used to attach a conduit for fluid communication with the interior of a tank 12. The fuel system component 14*a* includes a flange member 118 and a body portion 20. The body portion 20 terminates in an spigot end 22 and includes a mounting rib 24.

The difference between the flange 118 of FIG. 9 as compared to the flange 18 of FIG. 1 is the nature of the material from which the flange is manufactured. Rather than incorporating a film or similar barrier layer made from EVOH, the flange 118 is comprised of a material which is itself a barrier and thus does not need to be a multi-layer material. Materials such as the resin sold by the Dupont Company under the trade mark SELAR RB now sold as a barrier resin for plastic fuel tanks are suitable for this purpose. The barrier resin sold by Dupont is said to be a pellet blend of a nylon co-polymer and a proprietary adhesive for nylon and high density polyethylene. The SELAR material provides the required barrier performance to reduce evaporative emissions through the flange. In addition, the SELAR material is compatible for thermo-welding to polyethylene and also to nylon.

The flange member 18*a* may be made by a process similar to that illustrated in FIGS. 5 and 8. A parison 80 may be extruded and expanded. In this case, the parison is not a multi-layer parison but rather is a single-layer parison. When the parison is molded, a tubular member is formed. In order to form the flange 118, the parison is cut in a direction transverse to the general axis of the aperture within the parison. Successive cuts of a parison can be used to create a plurality of flange elements 118. As shown in FIG. 9, the flange element 118 can contain only a single material having the necessary barrier properties. The invention, however is not limited to a single material and could include other materials co-extruded at the same time if desired.

In order to make the fuel system component 14*a*, the body portion 20 may be manufactured from a material which has the desirable creep resistance or other desirable property. The flange member 118, because it is a modified polyethylene material, may be welded directly to the body portion 20 which may be made from nylon. In addition the flange member 118 may be welded directly to the exterior polyethylene layer 38 of the fuel tank 12.

Various other modifications and changes may be made to the invention. The foregoing is by way of a description of preferred embodiments only and is to be considered illustrative and not limiting. For the full scope of the invention, reference should be had to the appended claims.

I claim:

1. A process for making a fuel system component having a body portion and a flange member having a barrier layer for inhibiting hydrocarbon vapour flow through comprising:

forming said body portion, said body portion having an internal passageway, forming a multi-layer parison, said parison comprising at least a first polymeric layer, a second polymeric layer and said barrier layer wherein said barrier layer is between said first and second layers, expanding said parison to form a tube, having an axis, a width and a wall, said first and second polymeric layers, and said barrier layer extending axially of said tube, said wall defining an internal aperture extending axially along said tube and cutting said tube generally transversely to said axis to form a flange member wherein said flange member has first and second ends and the distance between said first and second ends is less than the width of said tube and attaching one end of said flange member to said body portion with said internal aperture in registry with said internal passageway.

2. The process of claim 1 wherein said parison is expanded by applying a vacuum pressure to the external surface of said parison.

3. A process for making a fuel system component having a body portion and a flange member having a barrier for inhibiting hydrocarbon vapour flow-through comprising, forming said body portion, said body portion having an internal passageway, forming a parison, said parison comprising a barrier for inhibiting hydrocarbon vapour flow-through, expanding said parison to form a tube having an axis, a width and a wall, said wall defining an internal aperture extending axially along said tube, and cutting said tube transversely to said axis to form a flange member, wherein said flange member has first and second ends and the distance between said first and second ends is less than the width of said tube and, attaching one end of said flange member to said body portion with said internal aperture in registry with said internal passageway.

* * * * *